Patented Feb. 24, 1931

1,793,635

UNITED STATES PATENT OFFICE

MARION C. REED, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.  Application filed April 5, 1930. Serial No. 442,044.

This invention relates to the art of preserving rubber, either in the vulcanized or unvulcanized condition, and to rubber compositions so preserved.

It is well known that rubber is subject to more or less rapid deterioration upon aging, especially when exposed to light, heat, or air. It has been proposed to treat rubber with so-called "anti-oxidants" for the purpose of retarding its deterioration and extending the period of its usefulness. Such previously known anti-oxidants include phenolic compounds, aromatic amino compounds, and the condensation products of aldehydes and amines.

This invention consists in treating rubber with a member of a new class of extremely effective anti-oxidants.

This class includes the asymmetrical diaryl hydrazines of the general structural formula

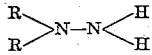

where R represents an aromatc hydrocarbon radical. For example, the class includes asymmetrical diphenyl hydrazine, ditolyl hydrazine, dixylyl hydrazine, di-biphenyl hydrazine, dinaphthyl hydrazine, phenyl tolyl hydrazine, phenyl biphenyl hydrazine, phenyl naphthyl hydrazine, tolyl naphthyl hydrazine, etc. These compounds may be prepared by any convenient method, such as by the reduction of the corresponding nitrosamine.

Rubber or rubber compositions may be rendered extremely resistant to deterioration by incorporating therein a small proportion of one of the above-mentioned asymmetrical diaryl hydrazines, preferably in the proportion of from 1/10 to 5 parts by weight being added to each 100 parts of rubber. Rubber so treated withstands oxidation or exposure to sunlight or the elements for a far longer period than similar untreated rubber, without sensible deterioration.

*Example 1.*—As a specific example of one embodiment of the method of this invention, a typical tire tread composition was prepared containing: blended plantation rubber 100 parts by weight, sulfur 5.5 parts, zinc oxide 30 parts, gas black 40 parts, mineral rubber 10 parts, palm oil 5 parts, hexamethylene tetramine 0.75 parts. This was divided into two portions, one of which was used as a control, while the other was mixed with 1.9 parts of asymmetrical diphenyl hydrazine (1% of the weight of the composition). The composition was thoroughly mixed, and vulcanized in a press for 45 minutes at 145° C. (290° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 79° C. (158° F.) in a constantly renewed stream of air.

In the table below T indicates ultimate tensile strength in pounds per square inch and E indicates ultimate elongation in percent of original length.

*Aging tests of diphenyl hydrazine*

| Antioxidant | Before aging | | After aging in the Geer oven | | | | | |
|---|---|---|---|---|---|---|---|---|
| | | | 2 days | | 5 days | | 7 days | |
| | T | E | T | E | T | E | T | E |
| None (control) | 3454 | 674 | 2881 | 551 | 1980 | 520 | 1749 | 493 |
| 1% diphenyl hydrazine | 3562 | 696 | 3289 | 643 | 2515 | 583 | 2085 | 560 |

*Example 2*—A rubber composition was prepared similar to that of Example 1 above except that the diphenyl hydrazine was purified by distillation before it was used. The vulcanized rubber was tested before and after aging in the Geer oven and in the Bierer-Davis bomb, in which the samples were maintained at the same temperature (70° C.) in an atmosphere of oxygen at a pressure of 300 lbs. per sq. in. In numerous tests the composition without the diphenyl hydrazine deteriorates to such an extent that its tensile strength after 48 hours in the Bierer-Davis bomb is less than 1000 pounds per square inch.

*Aging tests of purified diphenyl hydrazine*

| Antioxidant | Before aging | | After 7 days in the Geer oven | | After 48 hours in the Bierer-Davis bomb | |
|---|---|---|---|---|---|---|
| | T | E | T | E | T | E |
| Purified diphenyl hydrazine | 3800 | 717 | 2480 | 533 | 2680 | 600 |

From these examples it is evident that the asymmetrical diaryl hydrazines are extremely effective in retarding the deleterious action normally incident to the aging of rubber.

Obviously, the practice of this invention is not limited to the specific compositions given above, such compositions being merely illustrative of one manner of employing the anti-oxidants of this invention. The proportions of the constituents may be varied, or other substances may be substituted therefor, since this invention is applicable to pure rubber or rubber compositions of the most varied nature. Other accelerators such as aldehydeamine reaction products, diphenyl guanidine, di ortho tolyl thiourea, mercapto benzothiazol, tetramethyl thiuram monosulphide, etc. may be substituted for the hexamethylene tetramine of the examples above, although better results will be secured with some accelerators than with others. The anti-oxidants may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with asymmetrical diaryl hydrazine.

2. The method of preserving rubber which comprises treating rubber with asymmetrical diaryl hydrazine.

3. The method of preserving rubber which comprises vulcanizing rubber in the presence of an asymmetrical diaryl hydrazine.

4. The method of preserving rubber which comprises vulcanizing rubber in the presence of asymmetrical diphenyl hydrazine.

5. A composition of matter comprising rubber and an asymmetrical diaryl hydrazine.

6. A composition of matter comprising rubber and asymmetrical diphenyl hydrazine.

7. A composition of matter comprising rubber vulcanized in the presence of an asymmetrical diaryl hydrazine.

8. A composition of matter comprising rubber vulcanized in the presence of asymmetrical diphenyl hydrazine.

In witness whereof I have hereunto set my hand this 31st day of March, 1930.

MARION C. REED.

CERTIFICATE OF CORRECTION.

Patent No. 1,793,635.  Granted February 24, 1931, to

MARION C. REED.

It is hereby certified that error appears in the printed specification of the above numbered patent requiring correction as follows: Page 1, line 68, for "79° C." read 70° C.; page 2, line 70, claim 2, for "diaryl hydrazine" read diphenyl hydrazine; and that the said Letters Patent should be read with these corrections therein that the same may conform to the record of the case in the Patent Office.

Signed and sealed this 22nd day of September, A. D. 1931.

(Seal)

M. J. Moore,
Acting Commissioner of Patents.